United States Patent
Hoffmann

Patent Number: 5,772,192
Date of Patent: Jun. 30, 1998

[54] WORKBENCH, IN PARTICULAR FOR WELDING AND STRUCTURAL STEEL WORK

[76] Inventor: Gerhard Hoffmann, Brunnenstrasse 2, 79541 Lörrach, Germany

[21] Appl. No.: 673,777

[22] Filed: Jun. 27, 1996

[51] Int. Cl.$^6$ ..................................................... B25B 1/00
[52] U.S. Cl. ............................ 269/37; 269/910; 269/219
[58] Field of Search ............................... 269/36, 99, 100, 269/101, 45, 218, 219, 227, 291, 292, 293, 294, 295, 296, 297, 298, 299, 303, 315, 318, 319, 901, 910, 37; 182/181, 183; 83/467.1, 468, 468.7; 144/286.1, 286.5, 287

[56] References Cited

U.S. PATENT DOCUMENTS

| | | |
|---|---|---|
| 1,373,198 | 3/1921 | Munger . |
| 2,209,379 | 7/1940 | Bell ........................................ 269/227 |
| 2,852,049 | 9/1958 | Peterson ................................. 83/468.7 |
| 3,342,226 | 9/1967 | Marcoux . |
| 4,570,915 | 2/1986 | O'Hern . |
| 4,645,161 | 2/1987 | Collins . |
| 4,647,028 | 3/1987 | Yang ....................................... 269/219 |
| 4,860,807 | 8/1989 | Vacchiano ............................ 144/286.1 |
| 4,874,025 | 10/1989 | Cleveland ............................... 144/287 |
| 4,887,653 | 12/1989 | Thomas ................................ 144/286.1 |
| 4,909,491 | 3/1990 | Cheng . |
| 4,911,048 | 3/1990 | Osborne .................................... 83/468 |
| 5,116,249 | 5/1992 | Shiotani et al. .......................... 83/468 |
| 5,421,231 | 6/1995 | Break et al. ............................. 144/287 |

FOREIGN PATENT DOCUMENTS

| | | |
|---|---|---|
| 27 00 495 | 7/1978 | Germany . |
| 28 36 102 | 2/1980 | Germany . |
| 19 10 977 C3 | 12/1982 | Germany . |
| 37 16 057 | 12/1988 | Germany . |
| WO 84 03 347 | 8/1984 | WIPO . |
| WO 90 08 630 | 8/1990 | WIPO . |

*Primary Examiner*—Robert C. Watson
*Attorney, Agent, or Firm*—Henry M. Feiereisen

[57] ABSTRACT

A workbench, in particular for welding and structural steel work, includes a frame assembly having opposing axial ends and including a pair of traverses respectively disposed at the axial ends, and a pair of spaced substantially parallel platforms for forming working surfaces for installation and placement of workpieces, with the working surfaces being expandable in all directions by retractable or detachably secured elements. One of the platforms is stationarily fixed on the traverses and the other one of the platforms is movably supported on the traverses for displacement in direction of the stationary platform. Extending laterally of the stationary platform is a support unit for attachment of accessories and including at least one support and a guide bar secured to the frame assembly and configured of polyhedral cross section for guiding the support in longitudinal direction.

26 Claims, 5 Drawing Sheets

FIG. 8

WORKBENCH, IN PARTICULAR FOR WELDING AND STRUCTURAL STEEL WORK

BACKGROUND OF THE INVENTION

The present invention refers to a workbench, especially for welding and structural steel works, and in particular refers to a workbench of a type having a frame assembly including a leg structure for supporting at least two traverses and two longitudinal platforms formed with at least one channel extending in longitudinal direction, with one platform being stationary and the other platform being mounted in parallel and moveable in direction of the stationary platform.

When performing welding operations, especially for making structural steel members on a small scale in single piece production, conventional workbenches become rather cumbersome to use because the placement of the workpieces or workpiece components joined through welding in intended positions requires the use of provisionally assembled auxiliary tools.

Conventional weld and workbenches, typically utilized in locksmith work and structural steel work, are of simple structure and generally include tubular steel stands. An extension or enlargement of such workbenches is typically effected by placing steel beams thereon and accordingly shifting the steel beams by hand. In particular, when being subject to a one-sided load, there is a risk that the workbench and the beams are knocked over or tilted. Moreover, depending on the floor conditions of the workshop, a time consuming alignment of the components after each displacement becomes necessary.

Workbenches are generally used for making tools and constructions through conventional welding and other techniques, with angles and dogs being welded on the platforms and subsequently removed by hammer, chisel and abrasive tools upon completion of the necessary works. These preliminary and subsequent steps can only be executed by experts in a precise and cost-efficient manner, even when making simple components or constructions.

German Pat. No. DE-PS 19 10 977 discloses a clamping mechanism for a workbench having a subassembly for attachment of crossbars on both sides. Arranged on the crossbars in longitudinal direction are clamps, with one clamp being fixedly mounted, and with the other clamp being slidably mounted on the crossbar. In order to ensure a secure grasping between the clamps of objects that are not of right-angled or L-shaped configuration but considerably tapered, both crossbars accommodate spindle drives by which a displacement of the movable clamp in transverse direction on the crossbars is effected, with guide elements mounted on the crossbars suitably guiding the clamp during displacement. As both spindle drives can be actuated independently from one another via associated cranks and a sufficient play is provided during engagement of the spindle drive in the guide elements, the movable clamp can be positioned at an angle to the fixed clamp through actuation of only one of the spindle drives so that a suitable, independent actuation of the spindle drives allows installation of workpieces of one-sided tapered configuration. A parallel displacement of the movable clamp is effected through actuation of both spindle drives simultaneously in unison, with the planar surfaces of the clamps forming together a working surface.

The range of application of such a clamping mechanism is relatively limited. In particular, there are no arrangements for attachment and detachment of any accessories, such as angles, dogs or the like in a simple way. Also, an expansion of the working surface is not provided if need be.

German patent specification DE-OS 27 00 495 discloses a workbench with a vise having two clamping jaws guided on two traverses for parallel displacement in direction to and from each other by means of two crank mechanisms that are actuated independently from one another. Both clamping jaws are formed with a channel extending along their entire length for guiding accessories during displacement in longitudinal direction and securement at a desired location.

SUMMARY OF THE INVENTION

It is an object of the present invention to provide an improved workbench, obviating the afore-stated drawbacks.

In particular, it is an object of the present invention to provide an improved workbench which is universally applicable for handling not only smaller or medium sized workpieces but also workpieces of great size such as e.g. platform railings or banisters.

It is yet another object of the present invention to provide an improved workbench which allows accessories, such dogs, angles, clamps or the like to be placed within easy reach and to be moved in a rapid and continuous manner.

It is still another object of the present invention to provide an improved workbench which is suitable for less skilled persons, even trainees, to enable a cost-efficient and precise production of constructions and implements of any type.

These objects and others which will become apparent hereinafter are attained in accordance with the present invention by providing at least one guide bar of polyhedral cross section which is rigidly secured to the frame assembly in parallel disposition thereto and guides, with or without motor drive, at least one support therealong for installation of tools, dogs or like accessories by means of suitable fastening and clamping elements, and by enlarging the working surface formed by the top sides of the longitudinal platforms for placement of workpieces through attachment of extractable and retractable parts and/or detachably secured parts.

Preferably, the support is formed with horizontal and vertical clamping surfaces provided with threaded bores for receiving locking screws, and includes at least one C-shaped section which is positioned on the horizontal clamping surface and formed with upwardly open end for receiving screw fasteners, and a plate mounted rearwardly to the support and forming a bearing surface for abutment by the C section. The support may be formed on one side or on both sides of the vertical clamping surface with outwardly projecting lugs which are formed with bores for receiving bolts to which bars are swingably mounted for movement in a vertical plane to serve as stops or mountings.

Further areas for installation are effected by securing a mounting arm to the bar in a telescopic manner to allow a displacement of the mounting arm relative to the bar in a longitudinal direction, or by securing one end of the mounting arm via a joint to the bar so that the mounting arm is pivotable about a vertical axis. The mounting arm is equipped with fixing and clamping elements for installation of workpieces which are secured in a desired position on the mounting arm by a suitable locking device. Suitably, the mounting arm is provided with a C-shaped section exhibiting a T-shaped channel for attachment of clamping or fixing members via screw fasteners or bolts, and for attachment of an angle or a T section in a desired position by screw fasteners.

According to another feature of the present invention, the longitudinal platforms are each formed by two double T beams in parallel disposition, with their horizontal flanges spaced from each other at a distance, whereby the angle or T section secured to the C section is connected to the flanges of the double T beam of the stationary platform by screw fasteners, with the heads of the screw fasteners being securely received within the channel formed between the flanges and serving as abutment for the heads, and with the distance between the horizontal flanges slightly exceeding the shank diameter of the screw fasteners.

These attachments to the workbench greatly improve and expand the options for installation of workpieces as well as of tools and various accessories. As the installation is thus not limited to the channels of the longitudinal platforms, the possibilities for installation of workpieces are greatly varied as a consequence of the channels and clamping surfaces exhibited by the supports and the attached mounting arms that follow the displacement of the supports and in addition can be pivoted in various positions. Thus, complex spatial structures can be installed and aligned through exploitation of these universal fixing and clamping options together with accessories such as dogs, angles in conjunction with clamp clips, and tools and accessories, such as dogs, clamps or the like can be installed in various constellations so that different types of workpieces, also multi-part or spatial structures, can be secured and clamped in correct position also in conjunction with the bearing surfaces formed on the supports and mounting arms, whereby the components can be held in place through mechanical or magnetic means.

A workbench according to the present invention is capable of rapidly producing precise calibers and templates and allows even less trained operators, such as trainees having some knowledge of welding, to manufacture precise constructions, implements or railings and banisters in a cost-efficient manner.

According to another feature of the present invention, the two double T beams of each longitudinal platform suitably form a substantially enclosed space for accommodating a square tube which serves a guide sleeve for a square beam placed within the square tube for displacement in longitudinal direction. Preferably, the longitudinal platforms are provided on one end or both ends with such square beams guided in longitudinal direction in square tubes, with the outwardly projecting ends of the square beams joined by a cross member. Thus, the working surface can be greatly expanded and suited to the length of elongated workpieces through extracting the square beams on one or both sides. After use of the expanded working surface, the square beams are simple pushed back into the square tubes of the longitudinal platforms.

A further option for installation of workpieces is afforded by placement of a C section in the U-shaped exterior sides of the double T beams of each longitudinal platform. Insertable in the C section are screw fasteners, tie elements or other clamping tools for creating areas for attachment of more complex workpieces.

In order to effect a precise parallel guidance of the movable platform relative to the stationary platform, the traverses are each formed with a channel for guiding in form-fitting manner sliding or rolling means formed on the movable platform.

In accordance with another feature of the present invention, each traverse terminates flush with the outside surface of the frame and is extended to allow accommodation of especially large workpieces by attachment of a L-shaped angle which exhibits a vertical shank detachably secured to the outside surface of the frame and a horizontal free shank that extends in prolongation of the traverse. The free shank may be rigidly secured to the vertical shank or swingably mounted thereto for rotation about an axis by 90°. In the latter case, the free shank may be adjusted relative to the vertical shank at a right angle or moved downwards by about 90°. As the L-shaped angle remains on the frame, there is no necessity to attach and detach the L-shaped angle each time it is used.

Preferably, the lateral inside surfaces of the longitudinal platforms and/or the L-shaped sections are provided with a scale.

In order to facilitate the parallel displacement of the movable platform relative to the stationary platform, a drive mechanism is provided which includes a pair of crossbars extending parallel to and in proximity of the traverses and respectively secured at the axial ends to the frame, a pair of carriages secured to the movable platform and exerting a bearing pressure upon the crossbars, and a screw rod connecting the pair of carriages and having one end formed with a handwheel so that turning of the handwheel forces the carriages to move along the crossbars for displacement of the movable platform. An interlocking type drive is effected by forming the crossbars as toothed racks that mesh with pinions of the carriages to convert the turning of the hand wheel in a translational displacement of the movable platform.

Alternatively, the drive mechanism may also be formed by a pair of screw rods which extend parallel to and in proximity of the traverses and are rotatably mounted at the axial ends to the frame for displacement of nuts that are positioned on the screw rods and secured to the movable platform. The screw rods are connected to each other by a belt and are actuated by hand or a suitable motor so as to rotate in unison.

According to another feature of the present invention, the support includes a plate attached rearwardly to the support to form a vertical bearing surface for the C section, with the vertical surface of the plate and/or the vertical surfaces of the mounting arms having pockets to receive permanent magnets or electromagnets for ensuring an installation of the workpieces or workpiece components in a desired position before being worked on or welded.

The workbench according to the present invention affords the possibility to attach additional, preferable adjustable supporting surfaces for tools or to attach a welding assay rail to thereby avoid welding test specimens upon the working surface of the workbench.

BRIEF DESCRIPTION OF THE DRAWING

The above and other objects, features and advantages of the present invention will now be described in more detail with reference to the accompanying drawing in which:

FIG. 8 is a perspective view of a modification of the workbench of FIG. 1, illustrating extension elements for the traverses of the workbench.

DETAILED DESCRIPTION OF PREFERRED EMBODIMENTS

Figure 1:
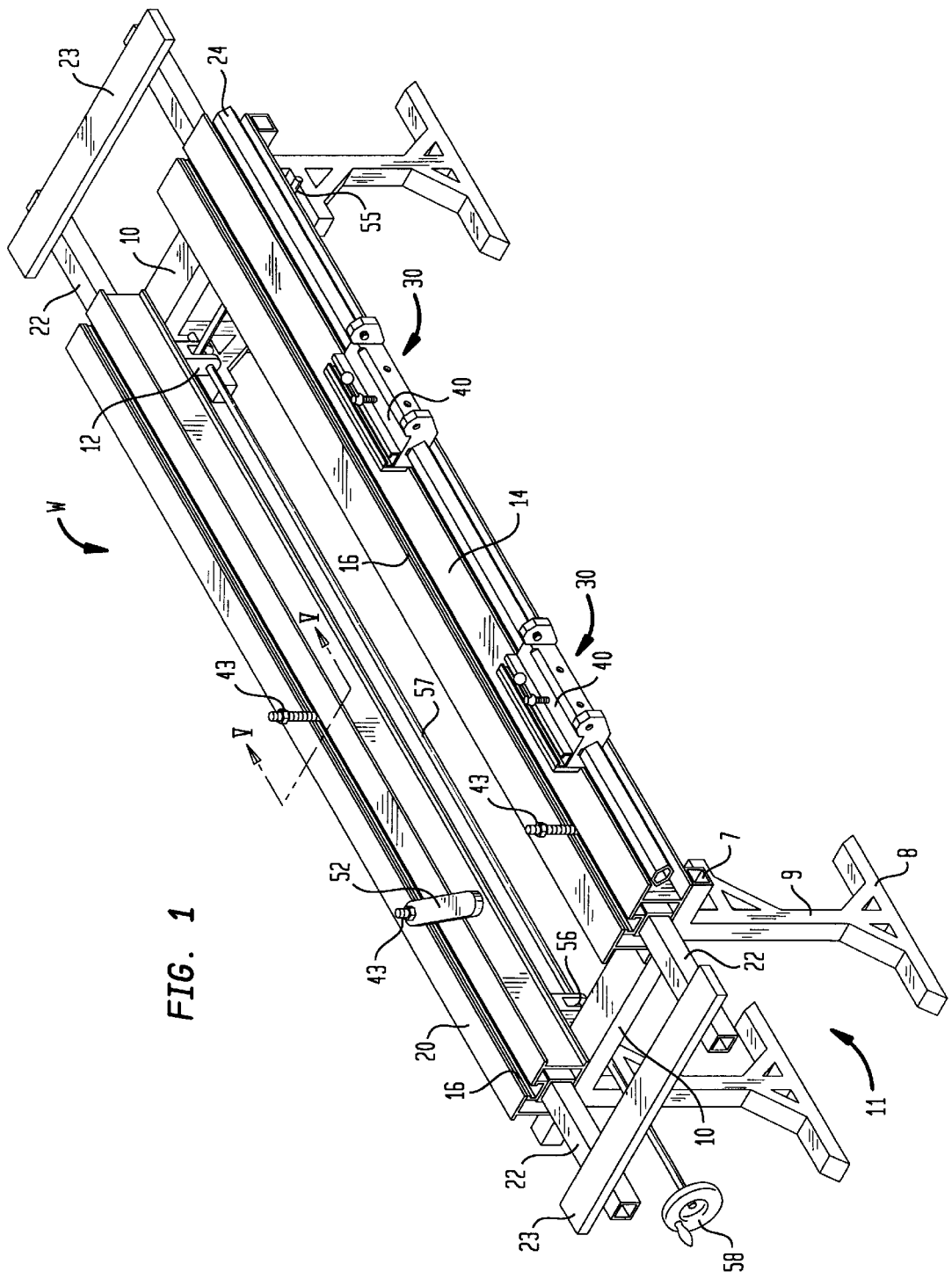
FIG. 1 is a perspective view of one embodiment of a workbench according to the present invention.

Throughout all the Figures, the same or corresponding elements are generally indicated by the same reference numerals.

Figure 2:
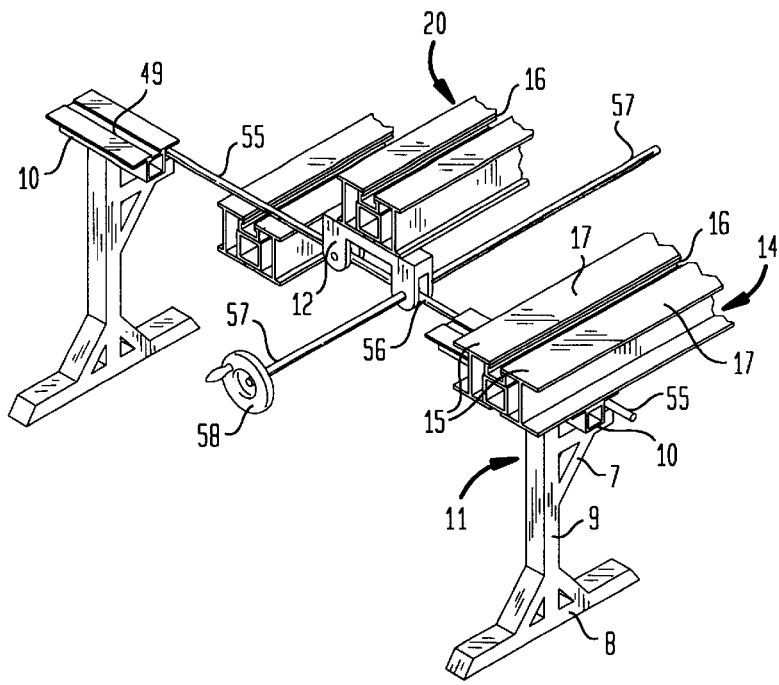
FIG. 2 is a fragmentary, perspective view of the workbench of FIG. 1, illustrating in detail a drive mechanism for moving a platform.

Turning now to the drawing, and in particular to FIG. 1, there is shown a perspective view of one embodiment of a workbench according to the present invention, generally designated by reference numeral W and including two frames 11 which are mounted in parallel relationship and comprised of legs 9 in spaced-apart disposition to define pairs of front legs and rear legs which are joined together at their upper ends by traverses 10. At their lower ends, the legs 9 terminate at in horizontal stands 8 for placement on the ground. Both frames 11 are joined together by a fixed longitudinal platform 14 which is mounted at its axial end to the traverses 10. Placed on the traverses 10 in parallel disposition to the platform 14 is a longitudinal platform 20 which is movable transversely in direction of the platform 14 by suitable guide means such as sliding pads that are received in channels 49 (FIG. 2) of the traverses 10. Although not shown in detail, the platform 20 is secured in a desired position by capstan screws or also by pneumatic cylinders.

Figure 3:
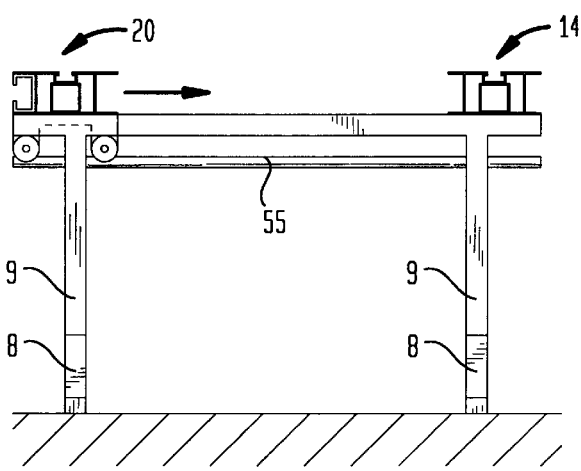
FIG. 3 is a schematic side view of the workbench of FIG. 1.

The legs 9 are formed with integral brackets 7 that are directed inwardly for supporting the ends of a pair of crossbars 55 that extend across the front and rear legs 9. As shown in particular in FIGS. 2 and 3, the crossbars 55 are part of a drive mechanism by which the platform 20 is moved to and fro with respect to the platform 14. The drive mechanism further includes a pair of carriages 12, respectively traveling on the two crossbars 55 via two rollers 56 in successive disposition, as best seen in FIG. 3. In order to effect a traveling of both carriages 12 in unison, one of the rollers 56 of each carriage 12 (e.g. the forward roller 56) is supported on a common shaft 57 which terminates on one end in a handwheel 58. A turning of the handwheel 58 causes the rollers 56 to roll along the crossbars 55, especially when the surfaces of the rollers 56 and the crossbars 55 are roughened.

Figure 6:
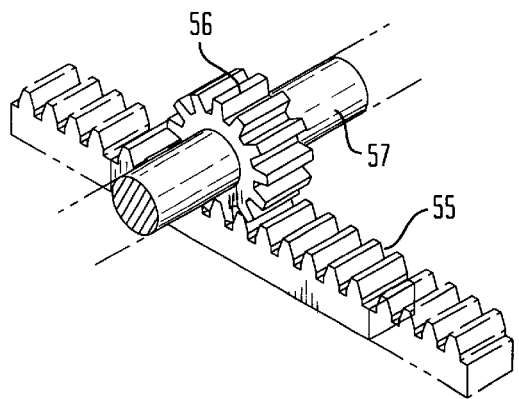
FIG. 6 is a fragmentary, perspective illustration of a modified drive mechanism of FIG. 2 in the form of a rack and pinion system.

FIG. 6 shows a variation of the drive mechanism which differs from the previously described embodiment in the manner of converting the rotation of the hand wheel 57 into a translational movement of the platform 20, which is now effected by a rack and pinion system, with the crossbar 55 being formed as rack and the roller 56 being formed as pinion.

As further shown in FIG. 1, the workbench W includes at the front or operator side a support unit, generally designated by reference numeral 30 and positioned laterally of the fixed platform 14. The support unit 30 includes two supports 40 that are slidable in longitudinal direction along a guide bar 24 of prism-shaped or polyhedral cross section, as shown in particular in FIG. 4, with the guide bar 24 being rigidly connected to the frames 11 or the stationary platform 14 by suitable brackets (not shown). Each support 40 exhibits a vertical clamping surface 28 and a horizontal clamping surface 27 which are formed with threaded bores 29 for engagement of screw fasteners 31. Suitably, the screw fastener 31 that is received in the bore 29 of the horizontal clamping surface 27 is formed with a handle 51 for facilitating the securement and release of the support 40 with respect to the guide bar 24. Thus, the support 40 can slide along the guide bar 24 after release of the screw fastener 31 and is locked in place by tightening the screw fastener 31.

Placed on the horizontal clamping surface 27 is a C section 26 with upwardly open end to define a channel 41 for receiving a screw fastener 31. The C section 26 abuts against a vertical bearing surface of a plate 47 secured rearwardly to the support 40. Projecting outwardly at each end and bounding the vertical clamping surface 28 are lugs 32 which are provided with threaded bores 33 defined by a horizontal axis X for optional engagement of locking screws or bolts 34 to install workpieces. The guidance of the supports 40 along the guide rod 24 is smooth and secure as a result of the polyhedral cross section.

Figure 4:
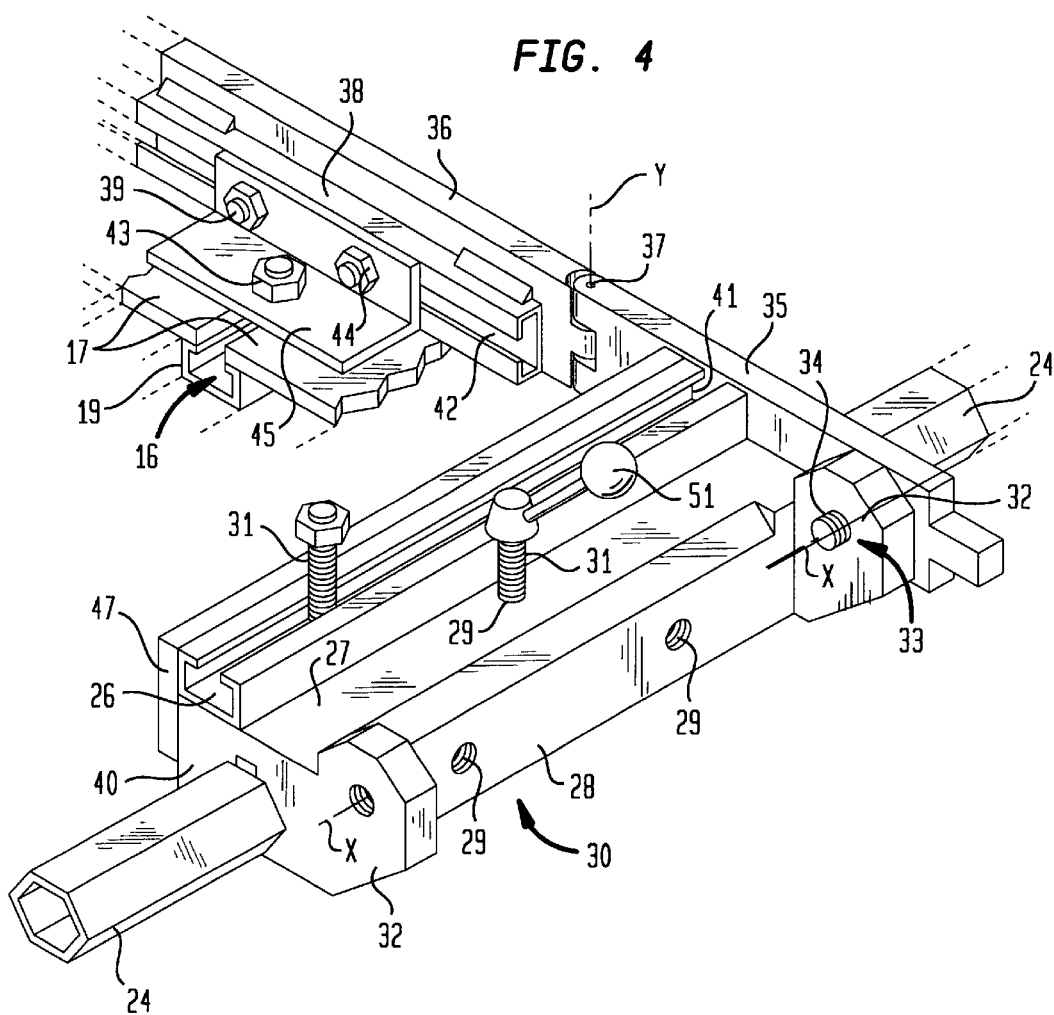
FIG. 4, is a fragmentary, perspective view of a support secured to the workbench of FIG 1.

It Is also possible to secure on each side of the support 40 a bar 35 (only the right hand beam 35 is shown in FIG. 4) which is rotatably mounted to the lug 32 by the bolt 34 for swinging in a vertical plane. The bar 35 forms a stop surface for workpieces secured on the support 40, e.g. to the C section 26 on horizontal surface 27, and clamped by screw fasteners 31. The lug-distant end of the beam 35 is articulated via a joint 37 to a mounting arm 36 which is swingable about a vertical axis Y and extends with its free end across the workbench W at a suitable length. Secured to an inner side wall is a C section 38 which is formed with a T shaped channel 42 for engagement by screw fasteners 39 to fasten an angle 45 by means of mating nuts 44. Persons skilled in the art will readily understand that the description of angle 45 is done by way of example only for illustrative purposes. Certainly, other workpieces or components can be secured to the C section 38, guided along the channel 42 and fixed in place at a suitable location. In the non-limiting example shown in FIG. 4, the angle 45 is fastened to the fixed platform 14 (FIG.1), with the mounting arm 36 being positionable at any desired angle with respect to the platform 14. Suitably, the C section 38 may be provided with a scale, e.g. to quantify an angular position of the mounting arm 36.

Figure 5A:
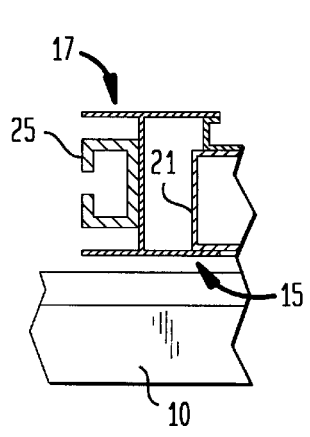
FIG. 5a is a fragmentary, sectional view of a variation of the platform configuration shown in FIG. 5.
Figure 5:
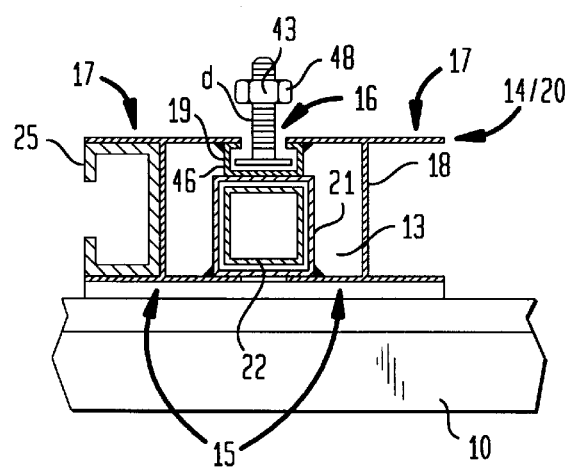
FIG. 5 is a sectional view of the workbench, taken along the line V—V in FIG. 1 and showing in detail a platform.

The platforms 14, 20 are of identical configuration, and as shown in FIG. 5. are formed by two double T beams, generally designated by reference numeral 15 and spaced in parallel disposition at a distance from each other at formation of a channel 16 and formation of a substantially closed interior space 13. Accommodated within the interior space 13 of each platform 14, 20 is a square tube 21 which is welded at the bottom to the inside surface of the lower flanges 17 of the double T beam 15. The top of the square tube 21 is welded onto a U shaped sheet 19 which is welded to the underside of the upper flanges 17 of the double T beams 15 to form the bottom of the channel 16 and to effect a stable structure of the platforms 14, 20.

Received within the square tubes 21 for guidance are square beams 22 which extend outwards from both ends of the platforms 14, 20 and are joined together at their extremities by cross members 23. Thus, the square beams 22 are extractable and retractable and form in the extracted positions together with the cross members 23 an additional support surface for very long workpieces or a deposit area for tools or workpieces.

As further shown in FIG. 5, the channel 16 of each of the platforms 14, 20 receives screw fasteners 43 which exhibit heads 46 guided in the channel 16 and secured by counternuts 48 for installing accessories. Thus, the spacing between the upper flanges 17 of the double T beams 15 slightly exceeds the diameter d of the screw shank.

Figure 8:
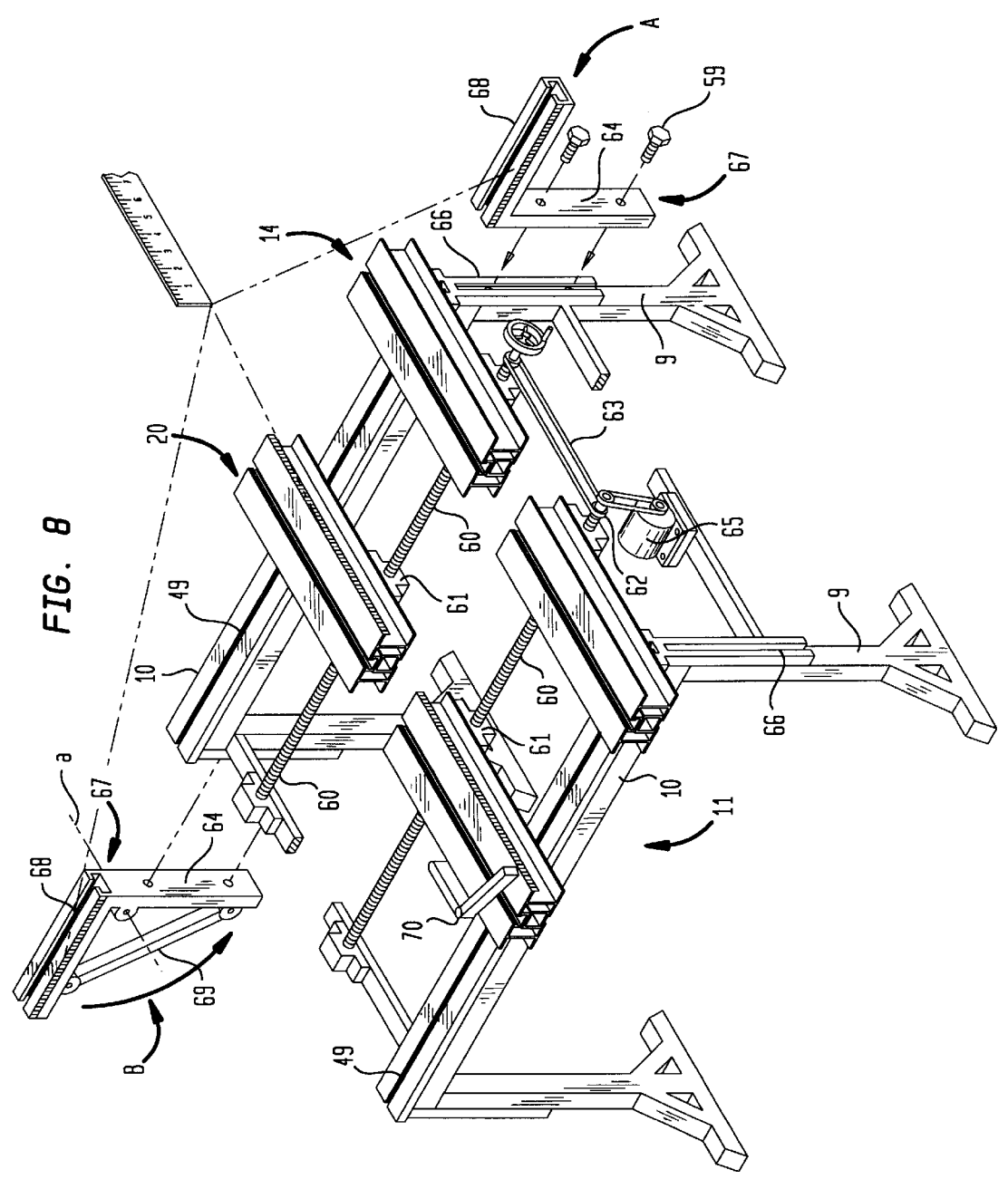

The double T beams 15 further include C sections 25 which are welded to the U-shaped exterior space as formed by the flanges 17 and the central web 18, for providing additional attachment options for tools or accessories, such as e.g. a stop angle 70, as shown in FIG. 8. In FIG. 5, the C section 25 completely fills out the exterior space. However, as shown by way of example in FIG. 5a, the C section 25 may also be selected of smaller size, if necessary.

FIG. 1 further shows the attachment of a stop member 52 which can be positioned at various angles and is slidably received in the channel 16 of the movable platform 20. A locking screw 43 secures the stop member 52 in a selected position.

Figure 7:
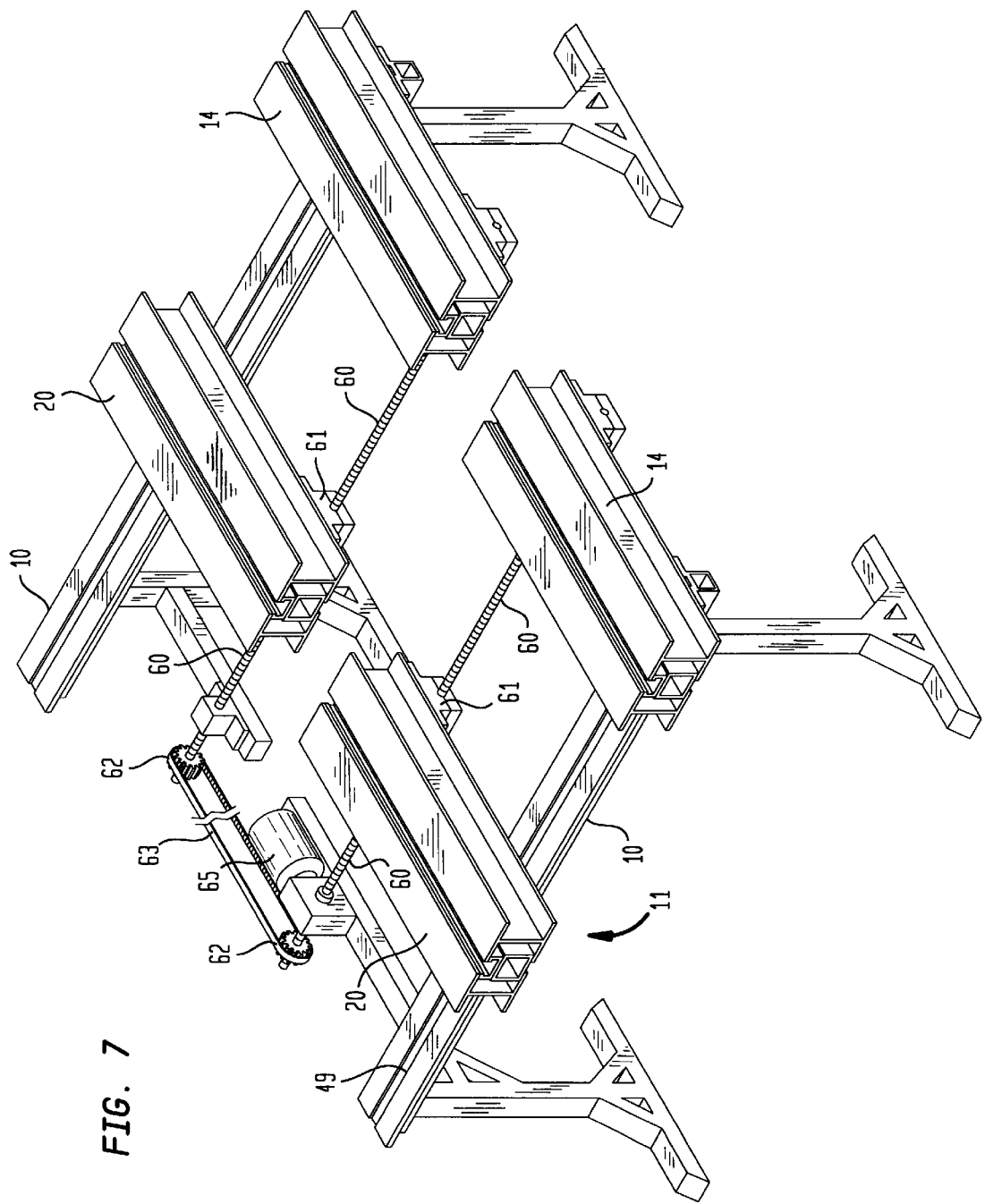
FIG. 7 is a perspective view of another embodiment of a workbench, with modified drive mechanism for displacement of the movable platform.

Turning now to FIG. 7, there is shown another embodiment of a workbench W with modified drive mechanism for moving the platform 20 relative to the platform 14. The drive mechanism includes screw rods 60 respectively positioned in proximity of the traverses 10 and extending across the workbench W perpendicular to the platforms 14, 20. At their one axial ends, the screw rods 60 are formed with sprocket wheels 62 for training an endless sprocket chain 63 which is driven by a motor 65 or manually by a crank (not shown). Moving along each screw rod 60 is a nut 61 which is secured to the platform 20. Thus, upon actuation of the motor 65 or turning of the crank, the sprocket wheels 62 are turned in unison via the chain 63 to simultaneously rotate the screw rods 60, thereby moving the nuts 61 in unison to displace the platform 20. Suitably, the crank can be used for fine tuning the position of the platform 20.

In order to permit a removal of the movable platform 20—or to allow modification of the workbench to additionally include a second movable platform—the nuts 61 are of split configuration and thus can be taken apart.

Turning now to FIG. 8, there is shown an additional feature of the workbench W according to the present invention, incorporating an extension of the traverses 10 to allow work on workpieces of great dimensions in addition to or also separately from the square beams 22 with cross members 23. As shown in FIG. 8, the traverses 10 terminate flush with the outer surface of the legs 9, with a mounting 66, preferably of C shaped cross section, being attached to the outer surface of each of the legs 9 and the axial end of the traverses 10. The mountings 66 are used for attachment of the vertical shank 64 of an L-shaped section 67 by screw fasteners 59. The other horizontal free shank 68 of the L-shaped section 67 has a C-shaped cross section to prolong the configuration of the traverse 10 including its channel 49.

FIG. 8 further shows various types of the L-shaped sections 67. Reference character A points to a L-shaped section 67 with shanks 64 and 68 being rigidly connected to one another. This type of L-shaped section must therefore be removed from the frames 11 after use. In contrast thereto, the type of L-shaped section as indicated by reference character B is not required to be removed after use, and may remain attached to the frames 11. This type of L-shaped section 67 has shanks 64, 68 which are swingably mounted to one another so that the free shank 68 can be swiveled about axis a relative to the shank 64 at an angle of about 90°. Thus, while the shank 64 remains attached to the frame 11, the shank 68 can be simply swung sideways or downwards into parallel disposition with the shank 64, with a swingable brace 69 securing the shank 68 in place.

Suitably, the lateral side walls, preferably the inner side walls of the traverses 10, of the free shanks 68 and of the platforms 14, 20 are provided with a scale. In addition, in order to ensure a clamping of the workpieces or workpiece components in the desired position before machining or welding, the vertical bearing surface of the plate 47 and/or the vertical surface of the mounting arm 36 have pockets (not shown) to receive permanent magnets or electromagnets.

While the invention has been illustrated and described as embodied in a workbench, in particular for welding and structural steel work, it is not intended to be limited to the details shown since various modifications and structural changes may be made without departing in any way from the spirit of the present invention.

What is claimed as new and desired to be protected by Letters Patent is set forth in the appended claims:

1. A workbench, in particular for welding and structural steel work; comprising:
   a frame assembly having opposing axial ends and including a pair of traverses respectively disposed at the axial ends, and a pair of spaced substantially parallel platforms for forming working surfaces for installation of workpieces, with a first platform being stationarily fixed on the traverses and a second platform being movably supported on the traverses for displacement in the direction of the first platform;
   a support means secured to the frame assembly for attachment of accessories, and including at least one support having horizontal and vertical clamping surfaces formed with bores for threadable engagement of screw fasteners and a guide bar rigidly secured to the frame assembly and extending parallel to one of the platforms, said guide bar being defined by a polyhedral cross section and guiding the support for displacement in longitudinal direction, said support means having a plate secured rearwardly to the support for forming an inwardly directed bearing surface provided with bores for threadable engagement of screw fasteners, and at least one C-shaped beam having an upwardly open end for receiving screw fasteners, said C-shaped beam bearing against the bearing surface and being disposed on the horizontal clamping surface of the support; and
   expansion means secured to the frame assembly for permitting an enlargement of the working surfaces.

2. The workbench of claim 1 wherein the support is formed on at least one axial end of the vertical clamping surface with a lug formed with a bore defined by a horizontal axis for receiving a bolt, said support means including a bar swingably mounted to the bolt for displacement in a vertical plane.

3. The workbench of claim 2 wherein the support means further includes a mounting arm movably connected to the bar and having clamping means for installation of workpieces which are insertable at a desired position of the mounting arm and secured thereto.

4. The workbench of claim 3 wherein the mounting arm is swingably mounted to the bar for rotation about a vertical axis.

5. The workbench of claim 3 wherein the mounting arm is provided with a C-shaped section exhibiting a T-shaped channel for receiving a screw fastener which is shiftable and securable in the channel for attachment of a fixture.

6. The workbench of claim 5 wherein the fixture is an angled section for installation at a selected position.

7. The workbench of claim 1 wherein each said platform is formed by two double T beams in parallel disposition and exhibiting flanges which are spaced from each other at a distance, with a fixture being adapted for securement to the first platform by a screw fastener having a head received within the channel between the flanges of the double T beams and forming an abutment for the head.

8. The workbench of claim 7 wherein the screw fastener has a shank defined by a diameter, with the distance between the flanges slightly exceeding the diameter of the shank.

9. The workbench of claim 1 wherein each of said first and second platforms is formed by two double T beams in parallel disposition exhibiting substantially horizontal flanges for forming a substantially enclosed space, said expansion means including a square tube secured within the space, and a square beam guided within the square tube for displacement in longitudinal direction.

10. The workbench of claim 9 wherein the square beam on one axial end of the first and second platforms project outwards beyond the one axial end for supporting a cross member.

11. The workbench of claim 9 wherein the square beam on both axial ends of the first and second platforms project outwards beyond the axial ends for supporting cross members.

12. The workbench of claim 9 wherein each said first and second platforms has exterior sides of U-shaped configuration, said platforms including a C-shaped section received in at least one of the exterior sides.

13. The workbench of claim 1 wherein the traverses are formed with a channel, said second platform having guide means received in the channel for form-fitting guidance during displacement in direction of the first platform.

14. The workbench of claim 1 wherein the frame assembly includes a leg structure exhibiting an exterior side, said traverses terminating flush with the exterior side, and further comprising extension means detachably secured to the exterior side of the leg structure for extending the traverses.

15. The workbench of claim 14 wherein each of the traverses is formed with a channel, said extension means including a L-shaped section exhibiting a first shank for attachment to the leg structure and a free second shank angled perpendicular from the first shank and formed with a channel, said second shank and the channel extending in alignment with the traverse and the channel of the traverse.

16. The workbench of claim 15 wherein the first shank and the second shank are rigidly connected to one another.

17. The workbench of claim 15 wherein the first shank and the second shank are swingably mounted to one another about an angle of 90°.

18. The workbench of claim 15 wherein at least one element selected from the group consisting of the first platform, the second platform, the traverses and the second shank of the L-shaped section is formed with a scale.

19. The workbench of claim 1, further comprising a drive mechanism for moving the second platform in direction of the first platform, said drive mechanism including a pair of crossbars extending parallel to and in proximity of the traverses and respectively secured at the axial ends to the frame assembly, a pair of carriages movably arranged at application of a bearing pressure on the crossbars and secured to the second platform, and a screw rod connecting the pair of carriages and having one end formed with a handwheel so that turning of the handwheel forces the carriages to move along the crossbars for displacement of the second platform.

20. The workbench of claim 19 wherein said carriages have rollers for movement along the crossbars.

21. The workbench of claim 19 wherein said crossbars are toothed racks, said carriages having pinions in mesh with the toothed racks.

22. The workbench of claim 1, and further comprising a drive mechanism for moving the second platform in direction of the first platform, said drive mechanism including a pair of screw rods extending parallel to and in proximity of the traverses and respectively secured at the axial ends to the frame assembly, a pair of nuts movably arranged on the screw rods and secured to the second platform and a drive means connecting both screw rods together and effecting a turning of the screw rods in unison.

23. The workbench of claim 22 wherein the drive means includes a handwheel securely fixed to one of the screw rods and a belt connecting the one screw rod to the other screw rod so that a turning of the handwheel effects a turning of the screw rods.

24. The workbench of claim 22 wherein the drive means includes a motor connected to one of the screw rods and a belt connecting the one screw rod to the other screw rod so that operation of the motor effects a turning of the screw rods.

25. A workbench, in particular for welding and structural steel work; comprising:
   a frame assembly having opposing axial ends and including a pair of traverses respectively disposed at the axial ends, and a pair of spaced substantially parallel platforms for forming working surfaces for installation of workpieces, with a first platform being stationarily fixed on the traverses and a second platform being movably supported on the traverses for displacement in the direction of the first platform;
   a support means secured to the frame assembly for attachment of accessories, and including at least one support and a guide bar rigidly secured to the frame assembly and extending parallel to one of the platforms, said guide bar being defined by a polyhedral cross section and guiding the support for displacement in longitudinal direction;
   expansion means secured to the frame assembly for permitting an enlargement of the working surfaces; and
   a drive mechanism for moving the second platform in direction of the first platform, said drive mechanism including a pair of crossbars extending parallel to and in proximity of the transverses and respectively secured at the axial ends to the frame assembly, a pair of carriages movably arranged at application of a bearing pressure on the crossbars and secured to the second platform, and a screw rod connecting the pair of carriages and having one end formed with a handwheel so that turning of the handwheel forces the carriages to move along the crossbars for displacement of the second platform.

26. A workbench, in particular for welding and structural steel work; comprising:
   a frame assembly having opposing axial ends and including a pair of traverses respectively disposed at the axial ends, and a pair of spaced substantially parallel platforms for forming working surfaces for installation of workpieces, with a first platform being stationarily fixed on the traverses and a second platform being movably supported on the traverses for displacement in the direction of the first platform;
   a support means secured to the frame assembly for attachment of accessories, and including at least one support and a guide bar rigidly secured to the frame assembly and extending parallel to one of the platforms, said guide bar being defined by a polyhedral cross section and guiding the support for displacement in longitudinal direction;

expansion means secured to the frame assembly for permitting an enlargement of the working surfaces; and a drive mechanism for moving the second platform in direction of the first platform, said drive mechanism including a pair of screw rods extending parallel to and in proximity of the traverses and respectively secured at the axial ends to the frame assembly, a pair of nuts movably arranged on the screw rods and secured to the second platform and a drive means connecting both screw rods together and effecting a turning of the screw rods in unison, wherein the drive means includes a motor connected to one of the screw rods and a belt connecting the one screw rod to the other screw rod so that operation of the motor effects a turning of the screw rods.

* * * * *